H. C. DICKINSON.
COMPRESSED AIR ENGINE FOR CONDUIT WIRE DRAWING.
APPLICATION FILED APR. 8, 1907.
907,474.
Patented Dec. 22, 1908.
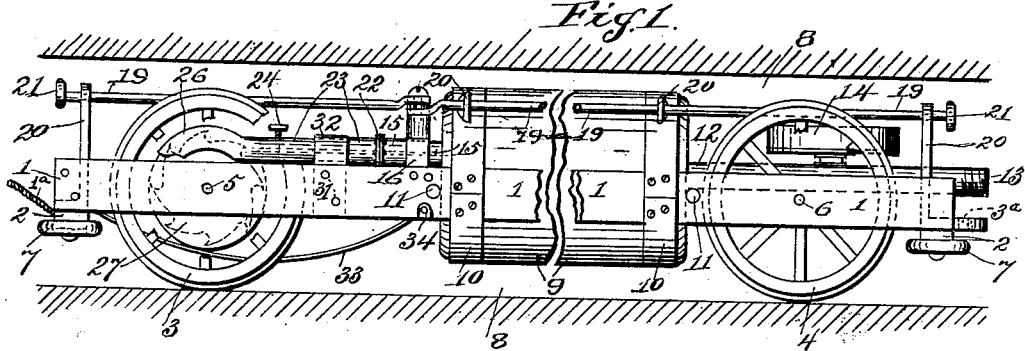
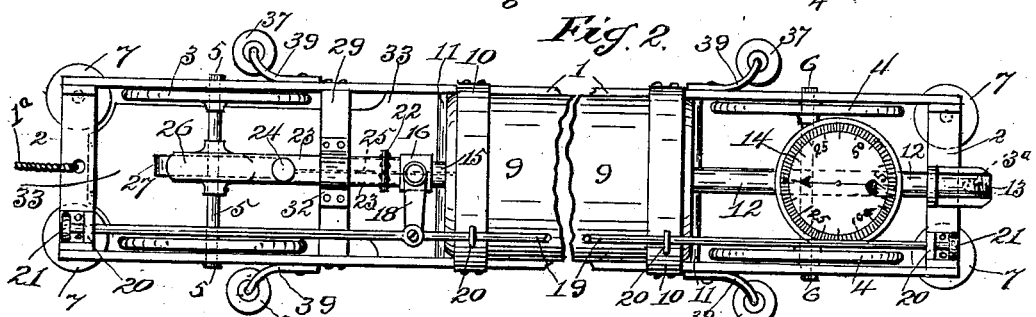
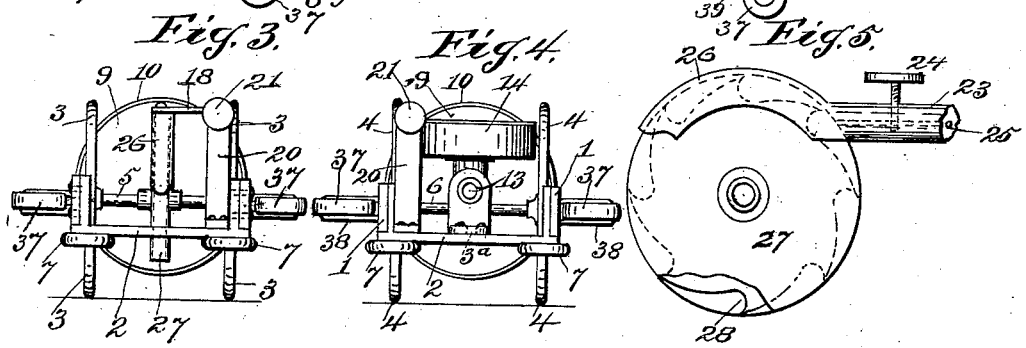
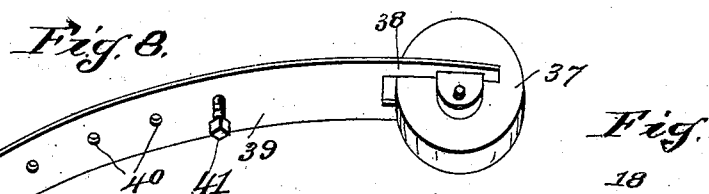
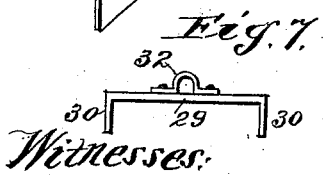
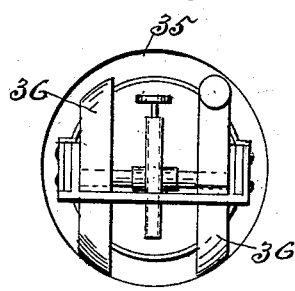
Witnesses:
Wm. E. Valk Jr.
W. F. Crossman
Inventor
Harry C. Dickinson
By C. F. Belt
Attorney
THE NORRIS PETERS CO., WASHINGTON, D. C.

UNITED STATES PATENT OFFICE.

HARRY C. DICKINSON, OF MOBILE, ALABAMA.

COMPRESSED-AIR ENGINE FOR CONDUIT WIRE-DRAWING.

No. 907,474.  Specification of Letters Patent.  Patented Dec. 22, 1908.

Application filed April 8, 1907. Serial No. 367,094.

*To all whom it may concern:*

Be it known that I, HARRY C. DICKINSON, a citizen of the United States, residing at Mobile, in the county of Mobile and State of Alabama, have invented certain new and useful Improvements in Compressed - Air Engines for Conduit Wire-Drawing, of which the following is a specification.

This invention relates to the class of wire-drawing, and especially to motors for pulling or drawing leading-in wires or lines through underground conduits, preparatory to drawing thereinto electric wires or cables.

The object of the invention is to provide an engine or motor of special construction embodying such novel features as will permit the motor or engine to travel in and through any of the usual conduits, or conduits or various sizes, shapes and constructions.

A further object of the invention is to provide, in an engine, such special features of construction and arrangement of parts as will expeditiously propel the engine, having a wire or line attached thereto, through the several compartments of an electric conduit preparatory to drawing electric wires or cables thereinto.

A still further object of the invention is to provide an engine adapted to travel through conduits of various sizes and shapes, and adapted to be charged with air for propelling the engine, and having certain novel and peculiar features for conducting its compressed air to a driving or motor-wheel, and special means for starting and stopping the engine.

A still further object of the invention is to provide a conduit engine or motor with novel and peculiar means for centering the engine in the conduit and to permit the engine to be operated in conduits of various sizes, shapes or constructions, having varying or uneven surfaces.

I am aware that various machines have been employed for carrying leading-in lines through conduits, but in order to accommodate such machines the conduits must be specially constructed, or provided with an independent carriage-way or conduit for the machines; or in self-propelling machines the mechanism is such as to render them inoperative except in large conduits, and such self-propelling machines are not capable of carrying sufficient motive power to drive them and drag a wire line through a conduit. Such machines, as far as known to applicant, are incapable of operation in conduits of various sizes, shapes or constructions, nor are they capable of traveling through rough and uneven surfaced conduits without interruption or stopping. It is therefore the purpose of this invention to overcome these and various other objections and disadvantages, and to furnish a self-propelled engine or motor of simple construction, of ample power to effect the results for which it is intended, and of expeditious operation.

In the accompanying drawings forming part of this application:—Figure 1 is a longitudinal section of an ordinary conduit showing the application of the invention partly broken away and with the centralizing rollers removed from one side of the engine. Fig. 2 is a top plan view of the engine partly broken away. Fig. 3 is an elevation of one end of the engine. Fig. 4 is a similar view of the other end of the engine. Fig. 5 is a detail elevation of the motor wheel partly broken away, and part of its air induction pipe. Fig. 6 is a detail elevation of the throttle valve and its arm. Fig. 7 is a detail elevation of the pipe-support and its keeper. Fig. 8 is a perspective view of one of the centralizing-rollers and its spring-arm. Fig. 9 is an end view of a circular conduit showing the application of the invention.

The same reference numerals denote the same parts throughout the several views of the drawings.

The engine truck consists of side-beams 1, and cross-heads 2 connecting the beams at each end thereof. Traction wheels 3 and wheels 4 have their axles 5 and 6, respectively, journaled in said beams. The cross-heads 2, each have a pair of guide rollers 7 journaled therein and revoluble perpendicular to the direction of travel or movement of the truck, so as to engage the sides of a conduit 8, for the purpose of centralizing and guiding the engine through the conduit. These wheels are of such diameter and thickness as to present such a contact peripheral surface that their travel will not be interfered with by any imperfections of the inner surface of the conduit; and their location or position on or relative to the truck is such as to prevent them from irregular rotation or twisting.

Centrally of the truck and secured thereto is a compressed air cylinder 9, having bands 10 which are attached to the truck; and the said cylinder is held against movement or in place at the ends by rods 11, extending from one to the other of the truck-beams. One end of the cylinder is provided with an air-supply-pipe 12 having a screw-end 13, for the purpose of attaching a suitable pump for charging the cylinder. The pipe 12 has an air-pressure-gage 14 connected therewith and supported thereon. The other end of the cylinder 9 has a pipe 15, provided with a throttle-valve 16, the stem 17 of which has an arm 18, to which are attached hand-rods 19 working through brackets 20, for operating the throttle-valve from either end of the truck, the ends of said rods being provided with hand-knobs 21. The pipe 15 is coupled at 22 to a tube 23 having a set-screw 24 for regulating the air passage 25 of said tube. The tube is provided with a hood 26, through which a motor wheel 27 is driven by the air discharged from said passage 25, into pockets 28 of the wheel. This wheel is fixed centrally to the axle of the traction wheel. A support 29 for the pipe 23 has angled-ends 30 secured to the truck-beams at 31; and a keeper 32 holds the pipe 23 to the support 29. A protector 33 is secured at 34 under the mechanism just described to protect the same. A suitable cord 1ᵃ is attached to one end of the truck for controlling the speed of the engine and the line or wire to be drawn is attached to the truck-end at 3ᵃ.

Supplemental centralizing guide-rollers 37 are attached to the truck beams in Fig. 4, to centralize the engine in conduits of such size as necessitate them. The rollers 37 are journaled in the forked ends 38 of a spring-arm 39, which has a series of apertures 40, and a set screw 41 for attaching the arm to the side of the truck so as to vary the distance of the rollers from the truck according to the size of the conduit.

Referring to Fig. 9 the engine is shown in a circular conduit 35, hence the wheels 36 have a beveled periphery. It is obvious that after the cylinder is charged with air, the rods 19 may be pushed in either direction to open and close the throttle-valve, and when the latter is open the air from the cylinder is conducted by the tube-passage 25, and the hood 26 into the pockets of the motor wheel to revolve the latter and the traction wheels, and thereby propel the engine.

It is to be understood that in the practical application the size, shape and material thereof may be changed, and that the mechanical construction and arrangement of parts may be varied as desired or as occasion may demand, without departing from the spirit of the invention.

Having thus described my invention what I claim as new and desire to secure by Letters Patent is:

1. The combination with an engine for underground conduits, of means for guiding and centralizing the engine in the conduits comprising a truck composed of side and cross beams on which the engine is mounted, guide rollers journaled under each corner of the truck, spring arms adjustable longitudinally on said side beams, and centralizing rollers journaled in the free end of said arms, substantially as set forth.

2. In a compressed-air engine for underground conduits, the combination, with the engine truck, a compressed air-cylinder supported by the truck, and a motor-wheel fixed to one of the axles of the truck, of a pipe leading from the cylinder, a throttle valve in the pipe, a tube flexibly coupled to the pipe and having a contracted air passage to the motor-wheel, a screw-valve in the tube to regulate such passage, a hood projecting from the tube over the motor-wheel, and means for operating said throttle valve from each end of the truck.

In witness whereof I hereunto set my hand in the presence of two witnesses.

HARRY C. DICKINSON.

Witnesses:
 R. GAILLARD,
 JESSE C. HURDLE.